US009030491B1

(12) United States Patent
Gilbreath et al.

(10) Patent No.: US 9,030,491 B1
(45) Date of Patent: May 12, 2015

(54) SYSTEM AND METHOD FOR DISPLAYING DATA FROM MULTIPLE DEVICES ON A SINGLE USER INTERFACE

(75) Inventors: Gary Gilbreath, San Diego, CA (US);
Darren Powell, San Diego, CA (US);
David Barbour, San Diego, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 350 days.

(21) Appl. No.: 13/449,499

(22) Filed: Apr. 18, 2012

(51) Int. Cl.
*G09G 5/00* (2006.01)
*G09G 5/14* (2006.01)
*G06F 3/0481* (2013.01)

(52) U.S. Cl.
CPC ............... *G09G 5/14* (2013.01); *G06F 3/0481* (2013.01)

(58) Field of Classification Search
CPC ....................................................... G09G 5/14
USPC ................................................. 345/629–641
See application file for complete search history.

(56) References Cited

U.S. PATENT DOCUMENTS

| | | | | |
|---|---|---|---|---|
| 5,121,478 A | * | 6/1992 | Rao ................................ | 715/804 |
| 6,025,841 A | * | 2/2000 | Finkelstein et al. ........... | 715/803 |
| 6,118,427 A | * | 9/2000 | Buxton et al. ................. | 345/629 |
| 6,889,363 B2 | * | 5/2005 | Maloney ........................ | 715/765 |
| 8,560,960 B2 | * | 10/2013 | Goossens et al. ............. | 715/782 |
| 2006/0253791 A1 | * | 11/2006 | Kuiken et al. ................. | 715/766 |

OTHER PUBLICATIONS

Yanco et al., Rescuing Interfaces: A Multi-Year Study of Human-Robot Interaction at the AAAI Robot Rescue Competition, Autonomous Robots, vol. 22, Issue 4, May 2007, pp. 333-352.*

* cited by examiner

*Primary Examiner* — Xiao Wu
*Assistant Examiner* — Charles Tseng
(74) *Attorney, Agent, or Firm* — SPAWAR Systems Center Pacific; Kyle Eppele; Ryan J. Friedl

(57) ABSTRACT

A method involves using a first software module loaded within a storage device to publish a first paint method under a first window object, the first window object covering a first portion of a display operatively connected to the storage device, using a second software module loaded within the storage device to publish a second paint method under a second window object, wherein the second window object at least partially overlaps the first window object and at least partially covers the first portion of the display, and displaying data within the first portion of the display by calling the first paint method and the second paint method in order based upon a property, such as a hierarchical-based property, of both the first window object and the second window object, where data originates from more than one hardware devices operatively connected to the storage device.

14 Claims, 5 Drawing Sheets

SYSTEM AND METHOD FOR DISPLAYING DATA FROM MULTIPLE DEVICES ON A SINGLE USER INTERFACE

FEDERALLY-SPONSORED RESEARCH AND DEVELOPMENT

The System and Method for Displaying Data from Multiple Devices on a Single User Interface is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; email ssc_pac_T2@navy.mil. Reference Navy Case Number 100810.

BACKGROUND

Traditionally, multiple users have been required to control multiple devices, such as unmanned systems, with each separate device having its own controller and user interface. In certain circumstances, it is necessary to have only one operator control multiple devices. In such a scenario, it is desirable to have the operator only focus on one user interface to increase their ability to accurately and reliably control the devices. Accordingly, a need exists for a system and method to display data from multiple devices on a single user interface.

DETAILED DESCRIPTION OF SOME EMBODIMENTS

The embodiments of the subject matter disclosed herein enable generalized control of unmanned systems and sensors via a unified user interface to a group of hardware components with no a priori knowledge of each other.

Previously-developed controllers were created to control specific robots or sensors using specialized hardware and software. They typically only controlled one instance of each device, though some could control/monitor multiple homogeneous devices. In each of these cases, the display and hardware were highly customized for a particular configuration, making it difficult and expensive to make any modifications.

Newer controllers have a limited ability to control heterogeneous devices using general purpose computing hardware, but adaptability and expansion are limited because the software is written monolithically. The few systems that are modular still require a priori knowledge of the devices and other modules for the system to function, which limits the ability to control new devices or display the data from those devices in new ways. Most of these systems also only support one protocol, also limiting their ability to control different types of devices. The systems and methods discussed herein overcome these drawbacks.

Figure 1:
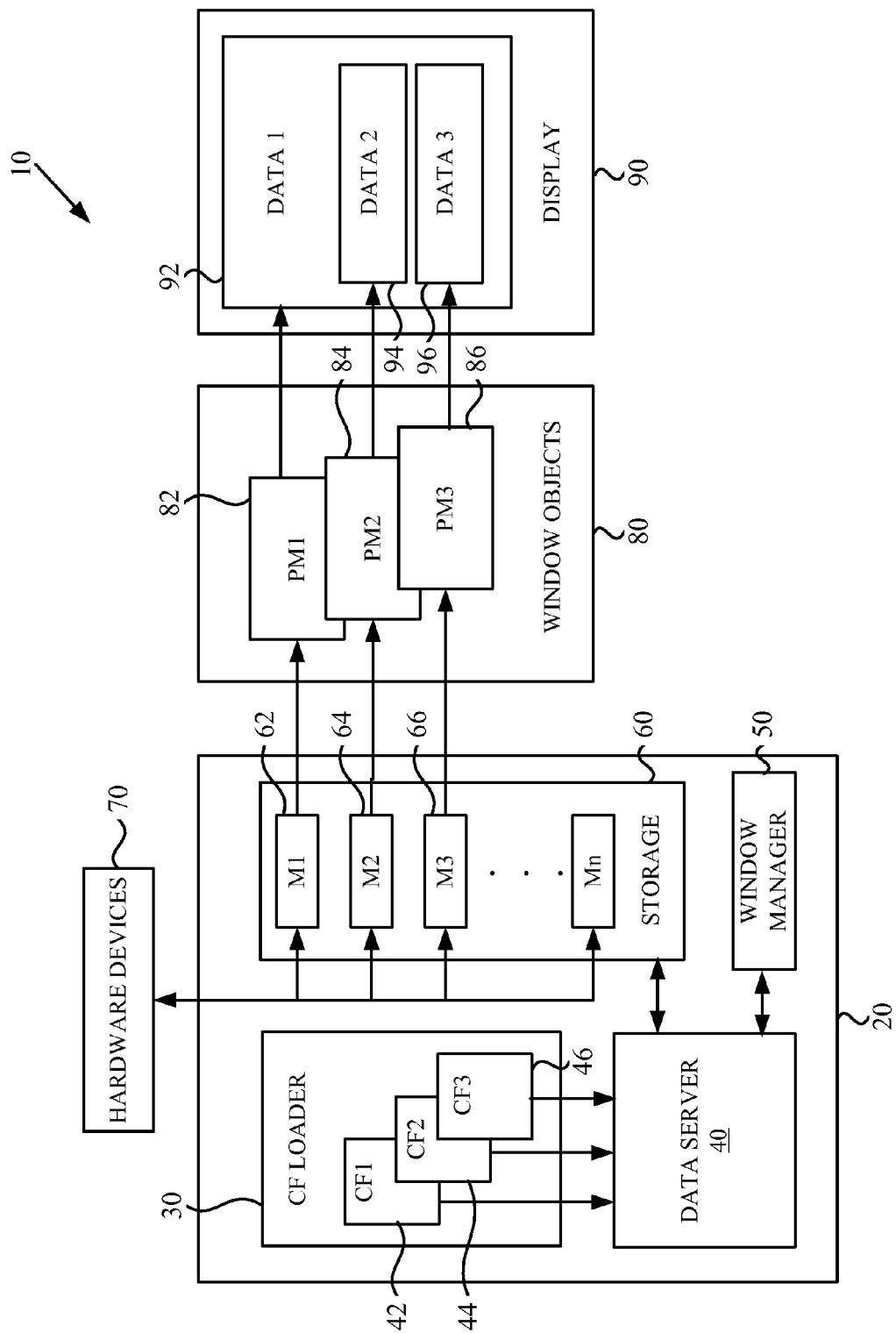
FIG. 1 shows a diagram of an embodiment of a system in accordance with the System and Method for Displaying Data from Multiple Devices on a Single User Interface.

Referring to FIG. 1, FIG. 1 shows a diagram of an embodiment of a system 10 in accordance with the System and Method for Displaying Data from Multiple Devices on a Single User Interface. System 10 includes a processing unit 20 operatively connected to hardware devices 70 and a display 90. Processing unit 20 includes a configuration file (CF) loader 30, data server 40, window manager module 50, and storage device 60. Storage device 60 includes a plurality of software modules, M1 through Mn, stored therein. Storage device 60 is operatively connected to hardware devices 70. Data server 40 includes a plurality of configuration files, such as configuration files 42, 44, and 46, stored therein, which are loaded by CF loader 30.

System 10 utilizes hardware along with dynamically loaded software modules, such as CF loader 30, data server 40, window manager module 50, and modules 62, 64, and 66. These modules may loaded from one or more directories at runtime by a loader module (not shown). The loader module does not know which modules will be loaded before it runs nor does it know what function each module performs. The loader module's function is to load the modules into storage, such as storage 60. Once loaded, the loader module may pass the loaded modules information such that they may communicate with data server 40, start the loaded modules, and stop them at termination.

As used herein, the term "module" generally refers to a software module. A module may be implemented as a collection of routines and data structures that performs particular tasks or implements a particular abstract data type. Modules generally are composed of two parts. First, a software module may list the constants, data types, variables, and routines that may be accessed by other modules or routines. Second, a module may be configured as an implementation, which may be private (i.e., accessible only to the module), and which contains the source code that actually implements the routines or subroutines upon which the module is based. The use of the term "module" indicates reference to such software modules or implementations thereof. The terms "module" and "software module" can be utilized interchangeably with one another to describe the same element or feature.

The systems and methods described herein may be implemented as a series of modules, either functioning alone or in concert with physical electronic and computer hardware devices. Such modules may be utilized separately and/or together locally and/or remotely to form a program product thereof, that may be implemented through non-transitory media. Operation of the modules will be discussed in more detail with respect to the methods described herein. The methods described herein may be implemented as a program product comprised of a plurality of such modules, which can be interactively displayed for a user on a display screen of a data-processing system (e.g., computer). Such interactivity may be provided by a specialized graphical user interface.

Once loaded and started, modules 62, 64, and 66 for example, communicate with each other via data server 40. Data server 40 provides a publish/subscribe mechanism whereby modules 62, 64, and 66 publish information that they want made available to other modules and subscribe to data that has been published into data server 40. Data server 40 may be configured to maintain a hierarchical structure of objects that have been published by modules, such as is shown in FIGS. 2 and 3.

Figure 2:
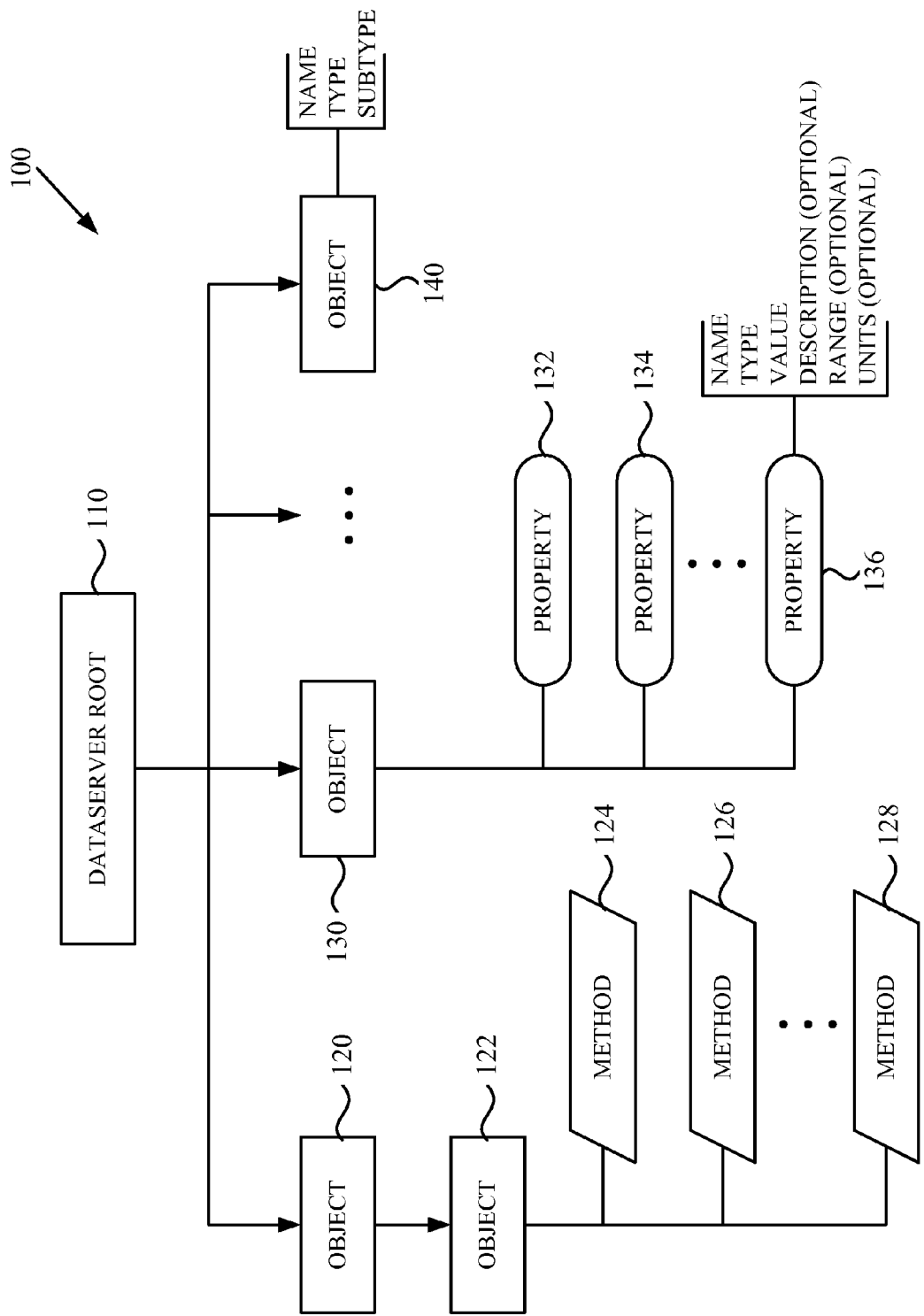
FIG. 2 shows a diagram of a data server root hierarchy that may be used in accordance with the System and Method for Displaying Data from Multiple Devices on a Single User Interface.

FIG. 2 shows a diagram 100 of a data server root hierarchy that may be used in accordance with the systems and methods discussed herein. As shown, a data server root 110 includes three objects, 120, 130, and 140 associated therewith. Each object may include information such as an object name, type, and subtype. Each object may also be the parent of one or more other objects. For example, object 120 is the parent of object 122.

In addition, each object can have properties associated with it. As an example, object 130 includes properties 132, 134, and 136 associated therewith. Each property may include information such as a property name, type, value, description, and units. These properties are where the majority of the data in data server 40 is stored. Subscriptions may be made to both objects and properties so that the subscriber is made aware of any changes made to that object or property. Object 140 does not contain any methods or properties associated therewith.

Data server 40 also supports method calls. A method is a function that is published under an object that can be called via data server 40 from any module. As an example, object 122 has methods 124, 126, and 128 associated therewith. This configuration provides very low latency for time-critical functions as well as a means of passing large amounts of data without incurring multiple copy operations. An example of where this is useful is when video data is being passed from one module to another. Methods can also return values, which can be used to return data immediately or to notify the caller that there was a failure.

Additional objects, properties, or methods may be added to an existing object without affecting the use of the object by current modules. This allows an object to represent a physical entity such as a camera or location on the screen. For example, the windowing module uses the position and size properties on a map window object, while the map module uses the center and extents on the same object to define the geographic area to display. Modules often are only concerned with a subset of all the properties of an object. Because a module has the ability to access only the properties it needs it is immune to future additions to the object, or to deletions of properties that it ignores. An example of how a data server root hierarchy changes after a module has published to the data server is shown in FIGS. 3A and 3B.

Figure 3A:
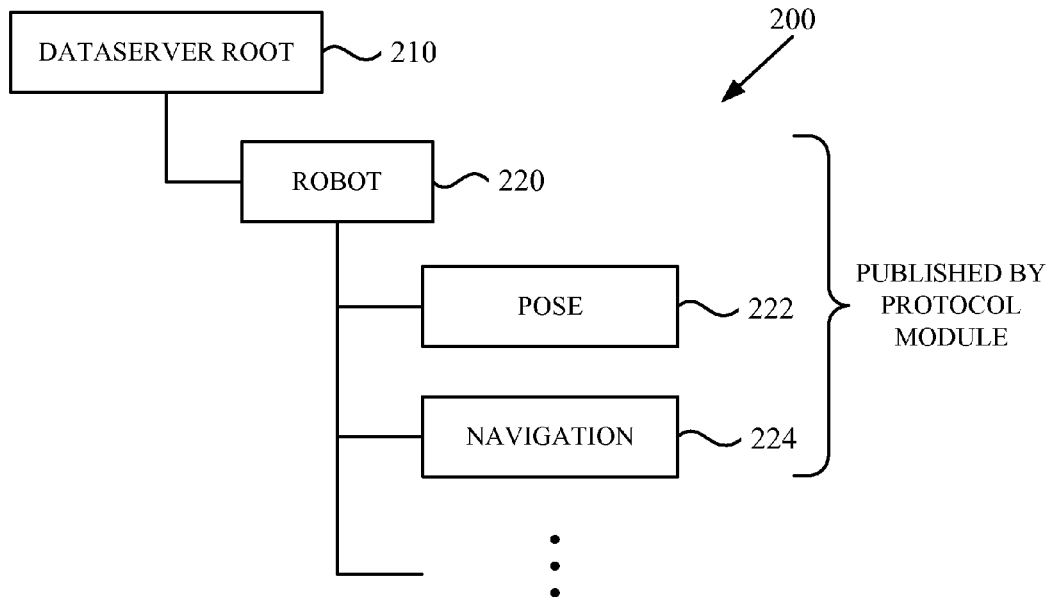
FIGS. 3A and 3B show diagrams illustrating changes to a data server root hierarchy after a module has published to the data server, in accordance with the System and Method for Displaying Data from Multiple Devices on a Single User Interface.
Figure 3B:
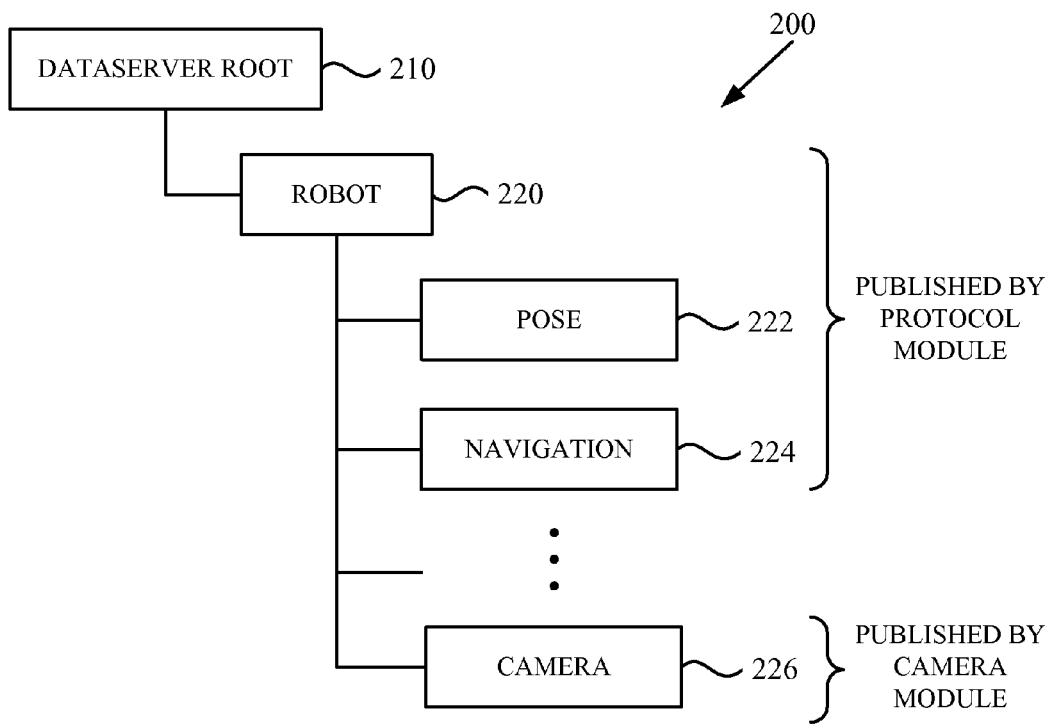

FIGS. 3A and 3B show diagrams 200 illustrating changes to a data server root hierarchy after a module has published to the data server. The example data server root shown in the figures represents an application involving a remotely-operated robot having various capabilities and sensors attached thereto. As shown in FIG. 3A, an example data server root 210 includes a robot object 220 located thereunder. Robot object 220 contains a pose object 222 and a navigation object 224 thereunder. Pose object 222 and navigation object 224 were both published to the data server, such as data server 40 shown in FIG. 1, by a protocol module. The protocol module is one of the software modules M1 through Mn stored within storage device 60 shown in FIG. 1.

FIG. 3B shows an updated diagram 200 illustrating data server root 210 after a separate software module publishes under robot object 220 in the data server. As shown, a camera module, which is stored within storage device 60 shown in FIG. 1, publishes a camera object 226 under robot object 220. Now, robot object 220 has the functionality of camera object 226. The system understands the robot as having pose, navigation, and a camera, but the protocol module need not be concerned that the camera object has been published by the camera module.

Modules can also modify objects and properties created by other modules. For example, a protocol module may publish a set of objects that represent a vehicle that includes a camera mounted on a pan and tilt actuator. However, the protocol may not be aware of the camera because it was added by a third party. The third party can provide their own module to control the pan, tilt and camera interface. This third party module publishes that information under an appropriate object on the vehicle published by the protocol module (usually under an object that closely matches the physical location of the camera). As far as the rest of the modules in the system are concerned, as well as the user, it appears that the vehicle and camera are part of a single unified system.

Objects and properties may be pre-loaded into data server 40 at run-time. This provides a mechanism for retrieving site-specific configuration information. For example, the appearance of display 90 (the location and size of various windows, buttons, controls, menus, etc.) is stored in one or more configuration files, such as configuration files 42, 44, and 46. CF loader 30 loads these configuration files into data server 40 so that they are available to other modules, such as modules 62, 64, and 66, at runtime. This pre-loaded data is indistinguishable from data created and stored in data server 40 at runtime, so there is no distinction between configuration data from a file and configuration data updated or created at runtime. Because configuration data and runtime data are indistinguishable, the screen, controls, and other aspects of the program can be completely dynamic.

Configuration files 42, 44, and 46 contain definitions of objects and properties. Having one module that reads this information and stores it into data server 40 simplifies and unifies the process of pre-loading data server 40 with data from one or more of hardware devices 70. It also means that individual modules do not have to provide their own configuration loading mechanism, making it easier to write modules and to keep the configuration format uniform across all modules.

A property, such as properties 132, 134, and 136 shown in FIG. 2, may also contain a script to be executed, making the property active rather than passive. In its simplest form, a property can contain an equation that pulls data from other parts of the data server resulting in a new value that would otherwise have to be hard-coded into one of the modules. More complex scripts can be written to perform tasks that result in objects being drawn on the screen, updating user interface elements, mapping joystick input to commands, etc. Because the scripting languages are implemented as other modules, there can be one or more scripting languages used in a particular installation. The functionality of system 10 does not require modules of any particular scripting language.

Modules may also draw on a screen, such as display 90. Screen drawing is coordinated through the window manager module 50. Configuration files 42, 44, and 46 define one or more areas of the screen, or display portions, along with an identifier to indicate which module is responsible for drawing on that particular display portion. These screen areas may be rectangular for example, and may overlap, such as shown by portions 92, 94, and 96 of display 90 in FIG. 1. The order in which the areas are drawn may be determined by the structure stored in data server 40 and may be further configured by an ordering property, such as a z-order.

Modules subscribe to the display configuration data looking for a window definition they recognize as their own. Once a definition is found, the module publishes a paint method, such as PM1, PM2, and PM3 shown in FIG. 1, under that window object. When it is time to display the data, window manager 50 calls each of the paint methods in the appropriate order. The ordering enables layering of window data as well as allowing multiple modules to draw to the same area of the display, without each module having any knowledge of the other modules.

For example, one module may be responsible for drawing live video data on the screen while a separate module could draw text and gauges (opaquely or semi-transparently) on top of the video image. A more complex example is where one module draws a three dimensional map on the screen while another draws three dimensional icons. The result is that the icons appear on the map in their correct geographic location, but the map module does not need to know of the other's existence. As such, either module could be replaced with a different module if a different map format or icon was needed.

The modularity of the systems and methods discussed herein allows for re-configuration without writing any new code and enables development of third party modules. Data server 40 allows modules to communicate with each other without a priori knowledge, which also facilitates third party development as well as allowing for the ability to upgrade or swap out modules for improved versions.

Data server 40, combined with the modularity, creates a synergistic effect that results when modules build upon each other. As mentioned above, modules can add capability to devices published by other modules, resulting in a seamless integration of the two. In addition, the systems and methods discussed herein enable the ability for multiple modules to draw to overlapping regions of the screen without interference or a priori knowledge of each other. The ability to separate the portions of display 90 for development purposes, but fuse them at run-time into an integrated whole, provides for the ability to increase the usability and user-friendliness of display 90. Other control software is limited to at most providing dedicated windows that only a single module can display data in, eliminating the ability for the synergism provided by an integrated display.

Referring back to FIG. 1, processing unit 20 is configured to publish paint methods to window objects 80 that are used to display data from hardware devices 70 on display 90. In some embodiments, window manager module 50 is configured to display the data in a layered format within the first portion 92 of display 90. The term "layered format" refers to data that may be displayed on top of or beneath other data to be displayed, without affecting the other displayed data. For example, video feed data may be displayed on top of geographical data, allowing a user to determine the surrounding environment at a particular geographic location Hardware devices 70 may be any device capable of providing data to be displayed on display 90. As an example, hardware devices 70 may include sensors for collecting heading, velocity, location, orientation, and other types of data, as well as cameras or other image capture devices, RADAR, LIDAR, chemical sensors, manipulators, and data from external command and control systems.

At least a first software module, M1, is configured to publish a first paint method, PM1, under a first window object 82. In some embodiments, first window object 82 is published into data server 40 prior to the publishing of the first paint method. First window object 82 is responsible for covering a first portion 92 of display 90. A second software module stored within storage device 60, M2, is configured to publish a second paint method, PM2, under a second window object 84. In some embodiments, second window object 84 is published into data server 40 prior to the publishing of the second paint method. Second window object 84 at least partially overlaps first window object 82 and at least partially covers first portion 92 of display 90.

In some embodiments, a third software module stored within storage device 60, M3, is configured to publish a third paint method, PM3, under a third window object 86. Third window object 86 may have been previously published into data server 40 and may at least partially overlap first window object 82 and at least partially cover first portion 92 of display 90. It should be recognized that system 10 may include more or less software modules, window objects, paint methods, and display portions depending upon the particular configuration and number of hardware devices 70 that provide data to be displayed on display 90. Window objects 82, 84, and 86 may all be stored within data server 40.

A window object manager module 50 is configured to display data within first portion 92 of display 90 by calling the first paint method, PM1, the second paint method, PM2, and the third paint method, PM3, in order based upon a property of both first window object 82, second window object 84, and third window object 86. In some embodiments, the property of first window object 82, second window object 84, and third window object 86 is a hierarchical-based property, such as a z-order.

In some embodiments, the first window definition is recognizable by the first software module, the second window definition is recognizable by the second software module, and the third window definition is recognizable by the third software module. As an example, each software module may recognize the respective window definition via a determination of the subtype of the respective window object. In some embodiments, first configuration file 42 further comprises one or more display properties of first window object 82, second configuration file 44 further comprises one or more display properties of second window object 84, and third configuration file 46 further comprises one or more display properties of third window object 86. The display properties are used to determine the size, position and drawing order.

In some embodiments, first window object information, second window object information, and third window object information each comprise one or more method calls that are directly callable by any software module loaded within storage device 60. An example of a method call is a paint method to cause data to be displayed within a window. In some embodiments, the method calls may comprise variable parameters and types. In some embodiments, the first window object information, second window object information, and third window object information are contained in a hierarchical structure within data server 40.

Figure 4:
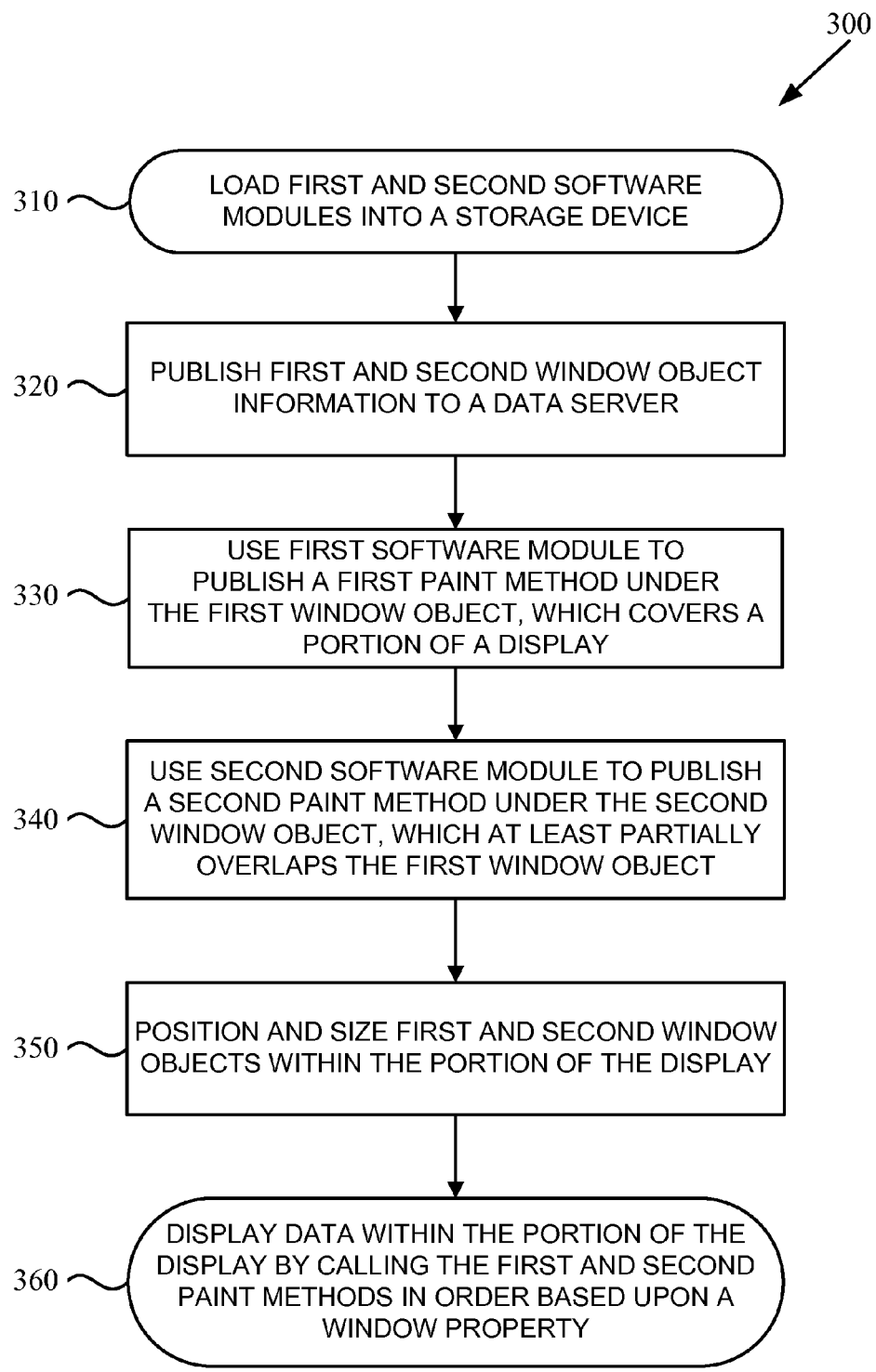
FIG. 4 shows a flowchart of an embodiment of a method in accordance with the System and Method for Displaying Data from Multiple Devices on a Single User Interface.

Referring to FIG. 4, FIG. 4 shows a flowchart of an embodiment of a method 300 in accordance with the System and Method for Displaying Data from Multiple Devices on a Single User Interface. For illustration purposes, method 300 will be discussed with reference to system 10 as shown in FIG. 1. Method 300 may begin at step 310, which involves loading first and second software modules, 62 and 64 respectively, into a storage device 60. Method 300 may then proceed to step 320, which involves publishing first and second window object information to a data server 40. Next, step 330 involves using a first software module 62, M1, loaded within storage device 60 to publish a first paint method, PM1, under a first window object 82. First window object covers a first portion 92 of a display 90 operatively connected to storage device 60. Step 340 involves using a second software module 64, M2, loaded within storage device 60 to publish a second paint method, PM2, under a second window object 84. Second window object 84 at least partially overlaps first window object 82 and at least partially covers first portion 92 of display 90.

Next, step 350 may involve positioning and sizing first and second window objects, 82 and 84 respectively, within the first portion 92 of display 90. Method 300 may then proceed to step 360, which involves displaying data within the first portion 92 of display 90 by calling the first paint method and the second paint method in order based upon a property of both first window object 82 and second window object 84. The data displayed in step 360 originates from more than one hardware devices 70 operatively connected to storage device 60. In some embodiments, the property of both first window object 82 and second window object 84 is a hierarchical-based property. As an example, the property of first window object 82 and second window object 84 may be a z-order. In some embodiments, step 360 involves displaying the data in a layered format.

In some embodiments, first window object 82 has a first window definition recognizable by first software module M1 and second window object 84 has a second window definition recognizable by second software module M2. The first window definition and the second window definition may be stored within data server 40.

In some embodiments, the first window definition and the second window definition are stored, respectively, within a first configuration file 42 and a second configuration file 44 that are loaded into data server 40 prior to the step of displaying data within first portion 92 of display 90. As an example, configuration files 42 and 44 may be loaded into data server 40 by CF loader 30. In some embodiments, first configuration file 42 further comprises one or more display properties of first window object 82 and second configuration file 44 further comprises one or more display properties of second window object 84. In such embodiments, method 300 further comprises the step of, prior to displaying data within first portion 92 of display 90, positioning and sizing first window object 82 within first portion 92 of display 90 based upon the display properties of first window object 82 and positioning and sizing second window object 84 within first portion 92 of display 90 based upon the display properties of second window object 84.

In some embodiments, the first window object information and second window object information each comprise one or more method calls that are directly callable by any software module loaded within storage device 60. In some embodiments, the method calls comprise variable parameters and types. In some embodiments, the first window object information and second window object information are contained in a hierarchical structure within a data server, such as data server 40.

Some or all of the steps of method 300 may be stored on a non-transitory computer-readable storage medium, wherein the steps are represented by computer readable programming code. The steps of method 300 may also be computer-implemented using a programmable device, such as a computer-based system. Method 300 may comprise instructions that, when loaded into a computer-based system, cause the system to execute the steps of method 300. As an example, method 300 may be implemented using various programming languages, such as "Java", "C" or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the non-transitory storage media, the non-transitory storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Figure 5:
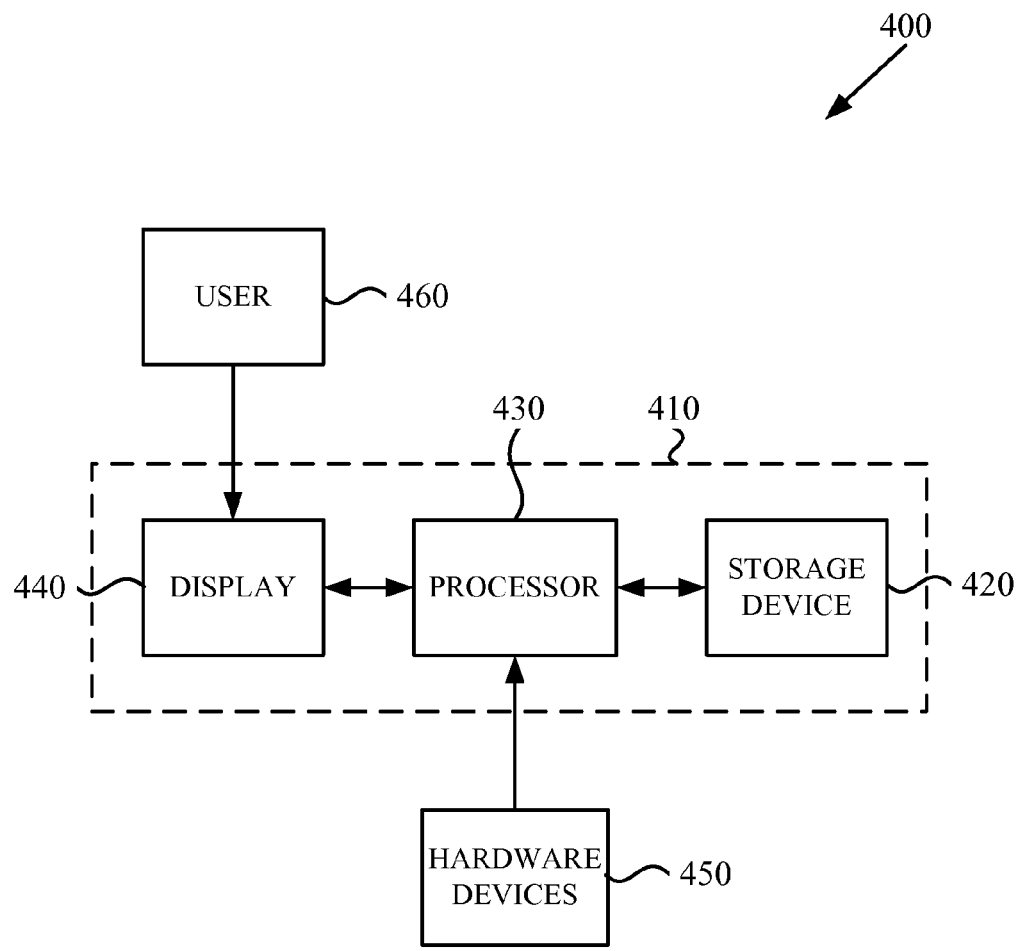
FIG. 5 shows a diagram of another embodiment of a system in accordance with the System and Method for Displaying Data from Multiple Devices on a Single User Interface.

FIG. 5 shows a diagram of another embodiment of a system 400 in accordance with the System and Method for Displaying Data from Multiple Devices on a Single User Interface. System 400 includes a computing unit 410 that includes a storage device 420 that is operatively connected to a processor 430, which is operatively connected to a display 440. In some embodiments, the components of computing unit 410 may be connected via wires or a wireless connection. Storage device 420 may include software modules, window objects, a window manager module, and a data server therein. Configuration files may be stored within the data server. The stored configuration files may contain display properties and window definitions therein.

One or more hardware devices 450 are operatively connected to computing unit 410. Hardware devices 450 may be similar to hardware devices 70 shown in FIG. 1. In some embodiments, hardware devices 450 are operatively connected to processor 430. In some embodiments, hardware devices 450 may be wired or wirelessly connected to computing unit 410. System 400 is configured to display data from hardware devices 450 to a user 460 via display 440.

Many modifications and variations of the System and Method for Displaying Data from Multiple Devices on a Single User Interface are possible in light of the above description. Within the scope of the appended claims, the embodiments of the System and Method for Displaying Data from Multiple Devices on a Single User Interface described herein may be practiced otherwise than as specifically described. The scope of the claims is not limited to the implementations and the embodiments disclosed herein, but extends to other implementations and embodiments as contemplated by a person having ordinary skill in the art.

We claim:

1. A method comprising the steps of:
   providing a data server containing a data server root and one or more configuration files therein, the configuration files containing display configuration data including one or more definitions therein, the definitions associated with particular objects published under the data server root;
   using a first software module loaded within a non-transitory storage device to publish at least one of a first object, a first property, and a first method to the data server root under an object having a definition recognized by the first software module;
   using a second software module loaded within the non-transitory storage device to publish at least one of a second object, a second property, and a second method to the data server root under the respective published first object, first property, or first method, wherein the second software module has no knowledge of the first software module and the respective published second object, second property, and second method does not interfere with the respective published first object, first property, and first method; and displaying data within overlapping portions of a display operatively connected to the non-transitory storage device by seamlessly integrating the respective published first object, first property, and first method and the respective published second object, second property, and second method, wherein the data originates from more than one hardware devices operatively connected to the non-transitory storage device.

2. The method of claim 1, wherein the definitions are window definitions and the particular objects are window objects, wherein the first software module publishes a first paint method to a first window object and the second software module publishes a second paint method to a second window object, wherein the step of displaying data comprises calling the first paint method and the second paint method in order based upon a property of both the first window object and the second window object, wherein the first window object covers a portion of the display and the second window object at least partially overlaps the first window object.

3. The method of claim 2, wherein the data is displayed in a layered format on top of or beneath other data to be displayed without affecting the viewing of the other data to be displayed.

4. The method of claim 2, wherein the property of both the first window object and the second window object is a hierarchical-based property.

5. The method of claim 2, wherein the data is displayed semi-transparently on top of other data to be displayed.

6. The method of claim 2, wherein the first configuration file further comprises one or more display properties of the first window object and the second configuration file further comprises one or more display properties of the second window object, wherein the method further comprises the step of, prior to displaying the data, positioning and sizing the first window object within the portion of the display based upon the display properties of the first window object and positioning and sizing the second window object within the portion of the display based upon the display properties of the second window object.

7. The method of claim 2, wherein at least one of the first property and the second property comprise an executable script.

8. A system comprising:
a data server containing a data server root and one or more configuration files therein, the configuration files containing display configuration data including one or more definitions therein, the definitions associated with particular objects published under the data server root;
a first software module loaded within a non-transitory storage device, the first software module configured to publish at least one of a first object, a first property, and a first method to the data server root under an object having a definition recognized by the first software module;
a second software module loaded within the non-transitory storage device, the second software module configured to publish at least one of a second object, a second property, and a second method to the data server root under the respective published first object, first property, or first method, wherein the second software module has no knowledge of the first software module and the respective published second object, second property, and second method does not interfere with the respective published first object, first property, and first method;
more than one hardware devices operatively connected to the non-transitory storage device;
a display operatively connected to the non-transitory storage device; and
a processor operatively connected to the non-transitory storage device, the processor configured to display data within overlapping portions of the display by seamlessly integrating the respective published first object, first property, and first method and the respective published second object, second property, and second method, wherein the data originates from the hardware devices.

9. The system of claim 8, wherein the definitions are window definitions and the particular objects are window objects, wherein the first software module is further configured to publish a first paint method to a first window object and the second software module is further configured to publish a second paint method to a second window object, wherein the processor is configured to display the data by calling the first paint method and the second paint method in order based upon a property of both the first window object and the second window object, wherein the first window object covers a portion of the display and the second window object at least partially overlaps the first window object.

10. The system of claim 9, wherein the processor is configured to display the data in a layered format on top of or beneath other data to be displayed without affecting the viewing of the other data to be displayed.

11. The system of claim 9, wherein the property of both the first window object and the second window object is a hierarchical-based property.

12. The system of claim 9, wherein the processor is configured to display the data semi-transparently on top of other data to be displayed.

13. The system of claim 9, wherein the first configuration file further comprises one or more display properties of the first window object and the second configuration file further comprises one or more display properties of the second window object, wherein the processor is further configured to position and size the first window object within the portion of the display based upon the display properties of the first window object and to position and size the second window object within the portion of the display based upon the display properties of the second window object.

14. The system of claim 9, wherein at least one of the first property and the second property comprise an executable script.

* * * * *